United States Patent [19]

Suzuki et al.

[11] 4,164,612
[45] Aug. 14, 1979

[54] PROCESS FOR PRODUCING WATER-SOLUBLE CATIONIC POLYMERS

[75] Inventors: Naoyuki Suzuki; Yoji Wada; Akihisa Furuno, all of Yokohama, Japan

[73] Assignees: Nitto Chemical Industry Co., Ltd.; Mitsubishi Rayon Co., Ltd., both of Tokyo, Japan

[21] Appl. No.: 847,025

[22] Filed: Oct. 31, 1977

[30] Foreign Application Priority Data

Nov. 4, 1976 [JP] Japan .................................. 51-131686

[51] Int. Cl.² .......................... C08F 2/00; C08F 2/10; C08F 18/22; C08F 126/06
[52] U.S. Cl. ....................................... 526/62; 526/214; 526/233; 526/234; 526/237; 526/265; 526/287; 526/292; 526/923
[58] Field of Search ................. 526/62, 233, 234, 237, 526/214, 923, 292, 287, 265

[56] References Cited

U.S. PATENT DOCUMENTS

| | | | |
|---|---|---|---|
| 3,405,106 | 10/1968 | Scanley | 526/923 |
| 3,661,880 | 5/1972 | Markert et al. | 526/62 |

*Primary Examiner*—Herbert J. Lilling
*Attorney, Agent, or Firm*—Cushman, Darby & Cushman

[57] ABSTRACT

In a process for producing a water-soluble polymer in an easily grindable glassy state by subjecting to aqueous solution polymerization a mixture comprising a monomer composed mainly of a vinyl monomer represented by the general formula (I):

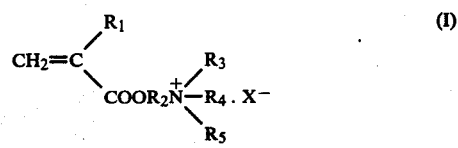

and water in an amount of 7 to 18% by weight based on the total weight of the monomer and water, a water-soluble salt in a powdery form is added to and dispersed in the polymerization system and the polymerization is carried out in the state that the powdery salt is dispersed, whereby a water-soluble polymer excellent in flocculating action and dissolving workability is obtained.

10 Claims, No Drawings

PROCESS FOR PRODUCING WATER-SOLUBLE CATIONIC POLYMERS

This invention relates to a process for producing a water-soluble polymer, which is excellent in flocculating performance and easy to handle, in an easily grindable glassy state at a high industrial production efficiency, by subjecting to aqueous solution polymerization at a high concentration a vinyl monomer composed mainly of a vinyl monomer represented by the following general formula (I) by adding a water-soluble salt in a powdery form and dispersing it in the polymerization system:

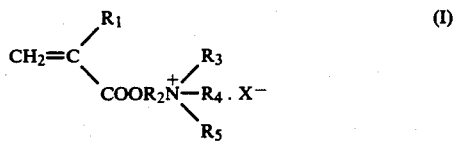

wherein $R_1$ represents —H or —$CH_3$; $R_2$ represents —$CH_2CH_2$— or —$CH_2CH(OH)CH_2$—; $R_3$ and $R_4$ represent —$CH_3$ or —$CH_2CH_3$; $R_5$ represents —$C_nH_{2n+1}$ in which n is an integer from 0 to 4, —$CH_2C_6H_5$ or —$CH_2COOH$; and $X^-$ represents $Cl^-$, $CH_3SO_4^-$, $CH_3SO_3^-$ or $\frac{1}{2}SO_4^{--}$.

The polymers derived from the vinyl monomers represented by the above-shown general formula (I) are creditted with high availability as effective cationic flocculants and widely in use as clarifying agents for domestic and industrial waste water or as dehydration aids for organic sludges.

Generally, a flocculant capable of forming strong and large flocs is required for a dehydration treatment in which a strong shearing force is exerted as in the case of centrifugal dehydration, while a flocculant capable of forming strong and small flocs is preferred for pressure dehydration where a strong force is loaded to the flocs during dehydration. On the other hand, a flocculant of the type that takes a high effect even when it is added in a small amount is desired for effecting cohesive sedimentation. Recently, light is being shed on superiority of cationic polymers with a high molecular weight and a high cationic group content in performance as flocculant or dehydrating agent which meets the said requirements.

However, the polymers with a high cation content and a high molecular weight are harder to dissolve than the low-molecular-weight polymers. Further, as the viscosities of their aqueous solutions are extremely high, the solutions per se become difficult to handle and also mixing the same with sludge or foul water becomes harder, and it becomes necessary to lower the polymer concentration in the solution. Thus, the polymers with a high cation content and a high molecular weight involve difficult problems in handling.

The flocculating performance and the tractability or easiness of handling of the product, as compared from the view-point of molecular weight, are in inverse relation. That is, if the molecular weight is increased for elevating the flocculating performance, the product obtained becomes hard to handle, while if it is attempted to obtain better tractability by lowering the solution viscosity, or by reducing the molecular weight, the flocculating performance of the product is lowered.

In practicing the process of this invention, the amount of water added affects greatly the grindability of the polymer produced, so that selection of an appropriate amount of water is of vital importance, particularly for after-treatment of the product. When the polymers obtained by aqueous solution-polymerization of a methyl chloride-quaternized salt of dimethylaminoethyl methacrylate with varying water contents were subjected to an impact test, the results as shown in Table 1 were obtained.

Table 1

| Water content (wt%) | Charpy impact test (kg/cm) | Test by grinder (hammer mill type) |
|---|---|---|
| 25 | >93.6 | X |
| 22.5 | >93.6 | X |
| 20 | 35 | A |
| 17.5 | 9.8 | B |
| 15 | 7.6 | B |

Notes:
(1)Charpy impact test was made on 16.5 mmo rod-shaped unnotched test specimens at 25° C.
(2)Rating of grindability; X - ungrindable; A - difficult to grind; B - easy to grind.

The present inventors have conducted extensive studies on means for improving the handling characteristics of said type of polymers while keeping the concentration as high as possible without sacrificing the flocculating performance and found that a satisfactory result can be obtained when the powder of a water-soluble salt selected from alkaline metal salts, alkaline earth metal salts and ammonium salts is previously added to the polymerization system composed mainly of a monomer represented by the general formula (I).

Generally, the following methods are conceived for mixing a powdery water-soluble salt with the polymer: (1) mixing the salt concurrently with dissolution, (2) mixing the salt with a powdered polymer, (3) mixing the salt with the polymer just after the completion of polymerization, and (4) mixing the salt with the polymerization system prior to polymerization.

In the case of the above-said method (1), a user mixes the salt with the polymer at the time of practical use. In this case, therefore, weighing of the material and other works are necessitated at the time of use, so that this method is more troublesome and time-consuming than using other types of flocculant, resulting in loss of appeal as a commercial product. Therefore, this method is usually impracticable. In case of mixing the salt with a powdery polymer by the method (2), there is required a very troublesome process which is determined by taking into consideration not only mixing method but also even packaging pattern depending upon the powder particle shape, size, distribution, difference in specific gravity, etc. in order to maintain the uniform mixing state. In this case, when the mixture is dissolved in water, the salt is first dissolved and then the flocculant is dissolved, so that the spread of the polymer molecules is limited by the dissolved salt to reduce the dissolving rate. In the case of the method (3), it is essential that the polymer immediately after polymerization is in a liquid state, but since the polymer concentration of such a solution is about 20% by weight at highest, a lot of energy is required for obtaining a powdery product from such a liquid polymer by drying and pulverizing it. Therefore, this method is unsuited for industrial production of powdery polymers. In the case of the method (4), the salt is usually dissolved in the polymerization solution and greatly affects the progress of polymerization, causing imperfect polymerization or reduced molecular weight of the polymer obtained. Thus, it was hardly possible with the conventional art to efficiently obtain a powdery polymer having a powdery water-soluble salt mixed uniformly therewith.

The present inventors have made efforts for obtaining a powdery polymer having uniformly mixed therewith a powdery water-soluble salt and being high in solubility, easy to handle and also excellent in flocculating performance, and found that the solubility of the powdery water-soluble salt is negligibly low in a high-concentrated aqueous solution of a vinyl monomer composed mainly of the monomer represented by the general formula (I), that is, in an aqueous solution of a vinyl monomer in which water is present in a very limited amount, and hence said salt exerts almost no adverse effect on the polymerization and is also scarcely dissolved in the solution during polymerization, and that a polymer having dispersed therein a powdery water-soluble salt is obtained.

According to the present invention, there is provided a process for producing a cationic polymer, which comprises subjecting to aqueous solution polymerization a vinyl monomer represented by the formula:

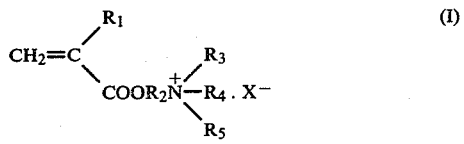

wherein $R_1$ represents —H or —CH$_3$; $R_2$ represents —CH$_2$CH$_2$— or —CH$_2$CH(OH)CH$_2$—; $R_3$ and $R_4$ represent —CH$_3$ or —CH$_2$CH$_3$; $R_5$ represents —C$_n$H$_{2n+1}$ in which n is an integer of from 0 to 4, —CH$_2$C$_6$H$_5$ or —CH$_2$COOH, and X$^-$ represents Cl$^-$, CH$_3$SO$_4^-$ or $\frac{1}{2}$SO$_4^{--}$ either alone or in admixture with up to 25% by weight, based on the total weight of the monomers, of other polymerizable vinyl monomers by use of a polymerization initiator in the presence of 7 to 18% by weight, based on the total weight of the monomer or monomers and water, of water and about 10 to about 40% by weight, based on the weight of the polymerization system, of a powdery water-soluble salt which is dispersed in the form of a powder in the polymerization system, in the absence of other media, thereby obtaining a water-soluble cationic polymer in the form of a solid mass.

The polymers obtained according to the process of this invention are easier to grind than the polymers devoid of any powdery water-soluble salt, and also the powdery products thereof are superior to those of the salt-free polymers in the rate of dissolution in water when the comparison is made by using the powdery products same in particle size. Such increased rate of dissolution may be attributed to synergism of various effects produced by use of said powdery water-soluble salt. For example, the powder of the water-soluble salt dispersed in the polymer particles takes up water while it is dissolved in water, thereby controlling swelling and dissolution of the polymer to a moderate degree while creating an effect of reducing the size of the polymer particles to a degree corresponding to the amount of the water-soluble salt existing in the polymer, and also the specific gravity of the powdery polymer is increased with incorporation of the water-soluble salt particles to minimize the chance of floating in water and formation of undissolved lumps of powder.

The water-soluble salts usable for the purpose of this invention include alkaline metal salts such as, for example, sodium chloride, potassium chloride, lithium chloride, anhydrous sodium sulfate, potassium sulfate, potassium dihydrogenphosphate, sodium acetate and potassium acetate; alkaline earth metal salts such as anhydrous calcium chloride, anhydrous magnesium chloride and anhydrous magnesium sulfate; and ammonium salts such as ammonium chloride, ammonium sulfate, ammonium dihydrogen-phosphate and ammonium acetate. In case of using a water-soluble salt having water of crystallization, the water content in the entire polymerization system increases and the softening temperature of the ultimately obtained polymer is lowered, so that it is necessary to make a suitable adjustment so that the total water content will become not more than 18% by weight. It is desirable that the water-soluble salt used in this invention is as small as possible in particle size because the smaller particle size provides more uniform dispersion, but usually there is used the salt with an average particle size of not more than 1 mm. The salt may be used in any amount provided that it does not disturb the polymerization operation, but it is usually used in an amount of from about 10 to about 40% by weight based on the total weight of the polymerization system including the monomer, water, the salt and other components. Addition of the salt in excess of the said amount range gives rise to undesirable effects such as unfacilitated agitation of the polymerization system and unsatisfactory mixing of the polymerization initiator.

As regards the vinyl monomers used in this invention, it is possible to use, beside those represented by the general formula (I), other types of monomers such as (meth)acrylonitrile, (meth)acrylamide, (meth)acrylic acid and alkali metal salts thereof, methyl (meth)acrylate, vinylpyridine, 2-methylpyridine, etc., for the purpose of copolymerization. However, care should be exercised in use of such vinyl monomers because they evolve more than double as much polymerization heat per unit weight as when using the vinyl monomers represented by the general formla (I), and hence the amount of such a vinyl monomer, when used, should not exceed 25% by weight, preferably should be confined within the range of up to 15% by weight. Mixing of such a monomer in a greater amount hampers control of the polymerization temperature.

As for the water content in the polymerization system, a good result is obtained when the water content is within the range of 7 to 18% by weight based on the total weight of the vinyl monomer and water. If the water content is less than 7% by weight, the polymerization operation becomes difficult to carry out, resulting in non-uniform polymerization, while if the water content in the polymerization system exceeds 18% by weight, the solubility of the salt is increased to give an adverse effect to the polymerization. Also, the softening point of the polymer is lowered to make the polymer difficult to grind.

The polymerization initiators usable in this invention include reducing agents such as ferrous salts, L-ascorbic acid and Rongalit sulfites; peroxides such as hydrogen peroxide, alkali persulfate, t-butylhydroperoxide and cumene hydroperoxide; and water-soluble azo compounds, and these materials may be used either singly or in suitable combination.

In practicing the above-said polymerization, it is desirable for obtaining good reproducibility of polymerization to carry out the polymerization after purging the oxygen present in the polymerization system by a suitable means such as replacement by nitrogen or deaeration.

The process of this invention is practiced, for example, in the following way: First a monomer composed mainly of a vinyl monomer represented by the general formula (I) is mixed with water so that the water content in the mixed solution is 7 to 18% by weight, and to this solution is added a powdery water-soluble salt so that the latter is uniformly dispersed in the solution. Then, the pH of the solution is adjusted to 2 to 9.5 and a polymerization initiator is added, and the mixture thus obtained is poured into a polymerization vessel to allow said mixture to undergo polymerization therein. In order to complete the polymerization, it is desirable to control the process so that the final-stage polymerization temperature falls within the range of 70° to 150° C., preferably 100° to 150° C. for at least 3 minutes.

The molecular weight of the polymer can be regulated by the amount or combination of the polymerization initiator(s) used. A salient feature of the process of this invention is that a polymer with an extremely high molecular weight is easily obtained, and this brings about a good result in obtaining a polymer with excellent flocculating performance.

The polymer thus produced is maintained at a temperature of 70° to 150° C., preferably 100° to 150° C. in the final stage of polymerization, and at this temperature, the polymer obtained is in the state of a half solid with flexibility, but this half-solid polymer may be turned into a glassy brittle mass when cooled. This mass can be sufficiently ground at room temperature, and fine grinding following rough grinding provides a powdery polymer with a salt uniformly blended therein. Such polymer may be packed as such in bags ready for shipping. This polymer is easily soluble in water and can be used with excellent effect as a dehydrating aid for organic sludge or as a clarifying agent for industrial waste water or sewage.

The finding of the above-described process of this invention has realized easy industrial production of a powdery polymer which has excellent flocculating performance and treating properties without causing separation of the water-soluble salt mixed in the polymer.

This invention is described in further detail below referring to Examples, but the invention is not limited to the Examples. In the Examples, all percents (%) are by weight, unless otherwise specified.

EXAMPLE 1

To 8 kg of an aqueous solution of a hydrochloride of dimethylaminoethyl methacrylate containing 15% by weight of water was added 2 kg of sodium chloride with an average particle size of 0.2 mm, and after well agitating the mixture and adjusting its pH to 6.0, the mixture was deaerated under vacuum, after which 0.4 gr of Rongalit C and 0.5 gr of a 30% solution of hydrogen peroxide were added to the mixture. After sufficient agitation, the mixed solution was put into a bag made of a 0.05 mm thick polyester film placed in a container, and then after inserting a thermocouple into the bag, the latter was sealed so that no air layer would exist in the upper part. Then the container was placed in a bath designed to allow the bath temperature to accord with the internal temperature of the bag, and the mixture was subjected to adiabatic polymerization while adjusting the bath temperature so that it stayed equal to the internal temperature of the bag. The mixture was shaken to inhibit precipitation of sodium chloride before start of polymerization, but such shaking was stopped after ascertaining start of polymerization.

The initial polymerization temperature was 20° C. The polymerization started 30 minutes after the addition of the polymerization initiator and 75 minutes had elapsed before the maximum temperature of 114° C. was reached. The polymerization system was maintained at this temperature for one hour. The container was taken out of the bath and allowed to stand at room temperature for two days and nights. Then, after cooling to room temperature, the polyester bag was torn off and the cooled polymer was crushed first by a jaw crusher for rough grinding and then by a hammer mill for fine grinding, thereby obtaining a powdered product with an average particle size of 1 mm. The powdered polymer showed a good solubility and a 1% aqueous solution with Brookfield viscosity of 1,500 cp was obtained by agitation in only 95 minutes.

In the case of the polymer to which no sodium chloride was added, 150 minutes was required for obtaining a similar solution.

EXAMPLE 2

Crystals of anhydrous sodium sulfate were added, in amounts shown in Table 1 below, into a solution consisting of 85% of crystals of a methyl chloride-quaternized salt of dimethylaminoethyl methacrylate and 15% of deionized water, and after adjusting the pH of the solution to 6.0, the solution was deaerated in a vacuum of 10 mmHg for 10 minutes. Thereafter, the solution was mixed with 0.01% of L-ascorbic acid, 0.001% of hydrogen peroxide and 0.005% of 2,2'-azobis(2-amidinopropane) hydrochloride, all based on the total weight of the polymerization system, and then polymerized and crushed in the same way as described in Example 1. The initial polymerization temperature was 20° C. The polymerization started about 10 minutes after addition of the polymerization initiator and the maximum temperature was reached in about 35 minutes in each case. The maximum temperatures of polymerization and the results of rating the obtained powdered polymers were as shown in Table 2.

Table 2

| Amount of anhydrous sodium sulfate added (%/polymerzation solution) | Maximum temperature of polymerization (°C.) | Time required for dissolution of powdered polymer* (min) | Brookfield viscosity of 1% aq. solution of powdered polymer (cp) | Sedimentation test in ultramarine blue suspension** | |
|---|---|---|---|---|---|
| | | | | Sedimentation rate (mm/sec) | Clarity (%) |
| 0 | 121 | 150 | 6,000 | 3.3 | 82 |
| 15 | 116 | 90 | 2,000 | 3.1 | 86 |

Table 2-continued

| Amount of anhydrous sodium sulfate added (%/polymerization solution) | Maximum temperature of polymerization (°C.) | Time required for dissolution of powdered polymer* (min) | Brookfield viscosity of 1% aq. solution of powdered polymer (cp) | Sedimentation test in ultramarine blue suspension** | |
|---|---|---|---|---|---|
| | | | | Sedimentation rate (mm/sec) | Clarity (%) |
| 30 | 110 | 90 | 550 | 3.0 | 86 |

Notes:
*Method of measuring time required for dissolution of each powdered polymer specimen: One liter of deionized water was put into a 1-liter beaker, followed by addition of 10 gr of each powdered polymer specimen, and after inserting a stirring rod provided with two-stage propeller type stirring blades, the solution was stirred at a speed of 120 r.p.m. and the time required for the polymer to get perfectly dissolved in the solution was measured.
**Sedimentation test in ultramarine blue suspension: 100 cc of a 2% suspension of ultramarine blue, adjusted to pH 7.0, was put into a covered measuring cylinder with an inner diameter of 20 mm and a height of 380 mm, followed by addition thereto of 1 cc of an aqueous solution of each polymer specimen adjusted to 0.1% polymer concentration. Then the cylinder was repeatedly turned over and set upright ten times in 30 sec., and after allowing the cylinder to stay stationary, the rate of transfer of the settling interface of ultramarine blue was measured. The measured value of maximum sedimentation rate was given as sedimentation rate. Then the supernatant liquid was put into a 10 mm thick cell and a light with a wavelength of 660 mµ was applied thereto to measure the transmission of light. Clarity was expressed by way of per cent transmission, assuming that light transmission through deionized water is 100%.

What is claimed is:

1. A process for producing a cationic polymer, which comprises subjecting to aqueous solution polymerization a vinyl monomer represented by the formula,

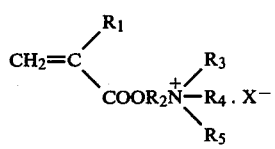

wherein $R_1$ represents —H or —$CH_3$; $R_2$ represents —$CH_2CH_2$— or —$CH_2CH(OH)CH_2$—; $R_3$ and $R_4$ represent —$CH_3$ or —$CH_2CH_3$; $R_5$ represents —$C_nH_{2n+1}$ in which n is an integer from 0 to 4, —$CH_2C_6H_5$ or —$CH_2COOH$; and $X^-$ represents $Cl^-$, $CH_3SO_4^-$, $CH_3SO_3^-$ or $\frac{1}{2}SO_4^{--}$, either alone or in admixture with up to 25% by weight, based on the total weight of the monomers, of other polymerizable vinyl monomers by use of a polymerization initiator in the presence of 7 to 18% by weight, based on the total weight of the monomer and water, of water and about 10 to about 40% by weight, based on the total weight of the polymerization system, of a powdery water-soluble salt selected from the group consisting of alkali metal salts, alkaline earth metal salts and ammonium salts which is dispersed in the polymerization system, in the absence of other media, thereby obtaining the water-soluble cationic polymer in the form of a solid mass.

2. A process according to claim 1, wherein the water-soluble cationic polymer in the form of a solid mass is further ripened at a temperature of 70° to 150° C. for a period of about 3 minutes or more.

3. A process according to claim 1, wherein the water-soluble polymer in the form of a solid mass is further ripened at a temperature of 100° to 150° C. for a period of about 3 minutes or more.

4. A process according to claim 1, wherein the vinyl compound represented by the general formula (I) is selected from the group consisting of sulfates, hydrochlorides, di-lower-alkylsulfates, lower-alkyl chloride-quaternized salts, chloracetate and benzyl chloride-quaternized salts of dimethylaminoethyl acrylate, dimethylaminoethyl methacrylate, dimethylaminohydroxypropyl acrylate, dimethylaminohydroxypropyl methacrylate, diethylaminohydroxypropyl acrylate and diethylaminohydroxypropyl methacrylate.

5. A process according to claim 1, wherein the said other copolymerizable vinyl monomers are at least one monomer selected from the group consisting of acrylonitrile, methacrylonitrile, acrylamide, methacrylamide, acrylic acid, methacrylic acid, methyl acrylate, methyl methacrylate, vinyl acetate, vinylpyridine and 2-methylvinylpyridine, and are used in an amount of 25% by weight or less based on the total weight of the monomers.

6. A process according to claim 1, wherein the water-soluble salt is selected from the group consisting of sodium chloride, potassium chloride, lithium chloride, sodium sulfate anhydride, potassium sulfate, potassium dihydrogenphosphate, sodium acetate, potassium acetate, calcium chloride anhydride, magnesium chloride anhydride, magnesium sulfate anhydride, ammonium chloride, ammonium sulfate, ammonium dihydrogenphosphate and ammonium acetate.

7. A process according to claim 1, wherein the pH of the polymerization system is adjusted to about 2 to 9.5.

8. A process according to claim 1, wherein the polymerization is carried out in a bag made of a polyester film.

9. A process according to claim 1 wherein the vinyl monomer of formula (I) is homopolymerized.

10. A process according to claim 1 wherein the water soluble salt is sodium chloride or sodium sulfate.

* * * * *